United States Patent
Worakasemuk et al.

(10) Patent No.: US 7,322,725 B2
(45) Date of Patent: Jan. 29, 2008

(54) LIGHT DEVICE FOR VEHICLE AND VEHICLE PROVIDED WITH SAME

(75) Inventors: Pairuch Worakasemuk, Samutprakarn (TH); Takeshi Okada, Samutprakarn (TH)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 259 days.

(21) Appl. No.: 11/162,770

(22) Filed: Sep. 22, 2005

(65) Prior Publication Data

US 2006/0181892 A1    Aug. 17, 2006

(30) Foreign Application Priority Data

Feb. 14, 2005    (JP) ............................. 2005-036348

(51) Int. Cl.
 *F21W 101/14*    (2006.01)
(52) U.S. Cl. .................. 362/473; 362/520; 362/522; 362/540; 362/332

(58) Field of Classification Search ................ 362/473, 362/475, 520, 521, 522, 540, 541, 327, 329, 362/332, 336, 338

See application file for complete search history.

(56) References Cited

U.S. PATENT DOCUMENTS

| | | | | |
|---|---|---|---|---|
| 1,243,652 | A | * | 10/1917 | Casey .................... 362/336 |
| 6,109,772 | A | * | 8/2000 | Futami et al. .............. 362/517 |
| 6,364,514 | B1 | * | 4/2002 | Natsume .................... 362/522 |

FOREIGN PATENT DOCUMENTS

JP         2526760 Y2    11/1996

* cited by examiner

*Primary Examiner*—Laura Tso
(74) *Attorney, Agent, or Firm*—Ernest A. Beutler (57) ABSTRACT

A vehicle and associated light source that comprises a single source of light and a surrounding housing and lens arrangement that gives the visual effect of multiple light sources.

7 Claims, 8 Drawing Sheets

LIGHT DEVICE FOR VEHICLE AND VEHICLE PROVIDED WITH SAME

BACKGROUND OF THE INVENTION

This invention relates to a light source for a vehicle or the like and more particularly to a light source that utilizes only a single light emitting device that provides the same appearance and light output as a source having a plurality of light emitting devices.

In some latest vehicles such as automobiles and motorcycles, a light device has employed one or more lamps each of which each of which employs a plurality of light emitting devices such as lamps or LEDs (light-emitting diodes) positioned in a single light source body. Such an arrangement is shown, by way of example, in published Japanese Patent Application JP-A-2004-193026. This improves not only the appearance but also the light transmission and recognition. However such an expedient is accompanied by a higher cost in relation to the number of LEDs, employed.

Therefore it is a principal an object of the present invention to provide a light source for a vehicle capable of improving appearance and visibility, without a large cost increase.

SUMMARY OF THE INVENTION

An embodiment of the invention is adapted to be embodied in a light source for a vehicle or the like and comprises a light housing defining an internal cavity between a rear reflective portion and a front light transmitting portion. A light emitting device holder is provided that is adapted to support a single emitting device source within the internal cavity. The front light transmitting portion has a plurality of highly transparent portions for transmitting light reflected from the single light emitting device by the rear reflective portion. These highly transparent portions are surrounded by less transparent portions to provide a view that emulates multiple light sources.

A further feature of the invention is comprised of a vehicle having a light source as described in the preceding paragraph.

DETAILED DESCRIPTION

Figure 1:
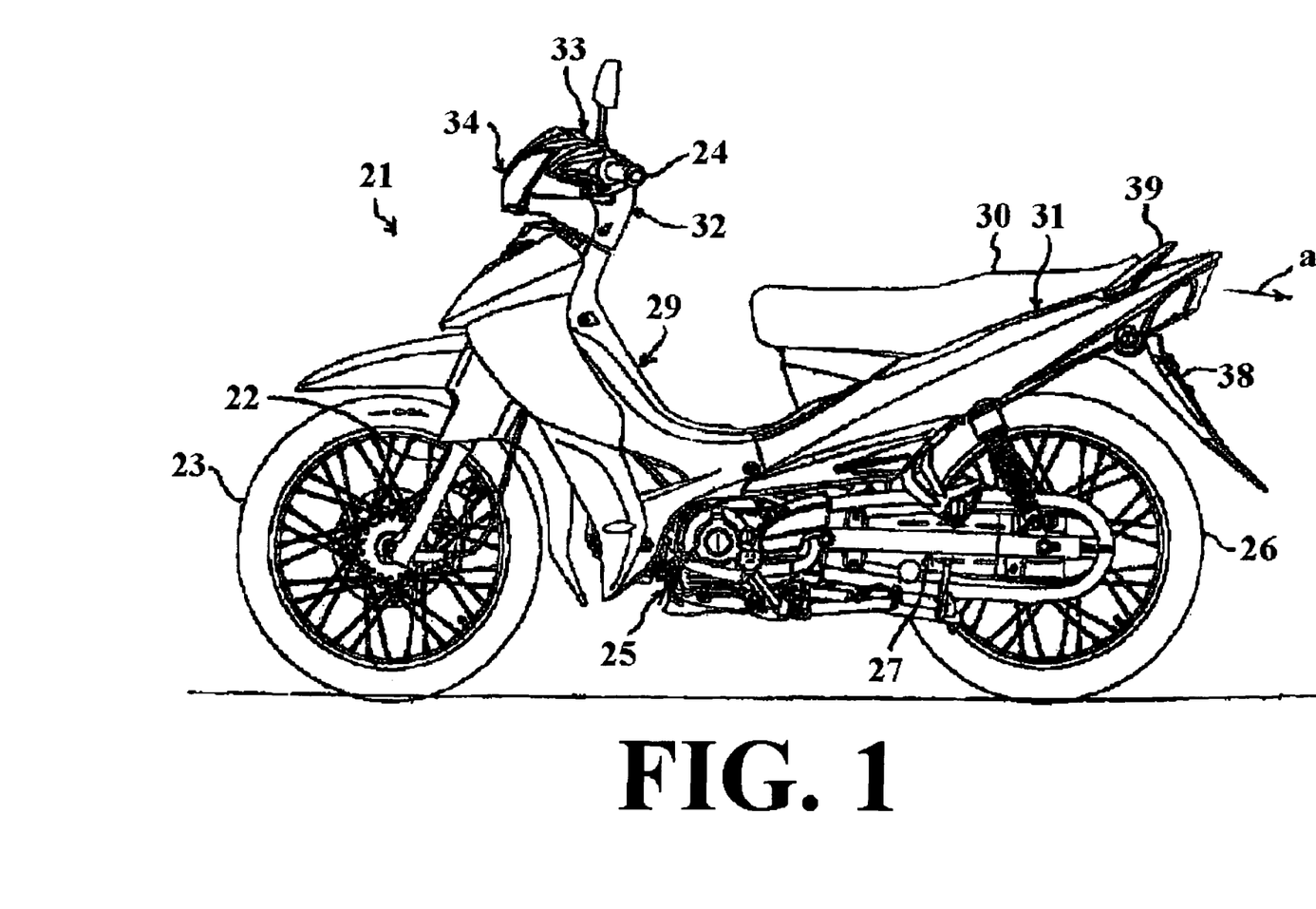
FIG. 1 is a side elevational view of a vehicle provided with a light source embodying the invention.
Figure 2:
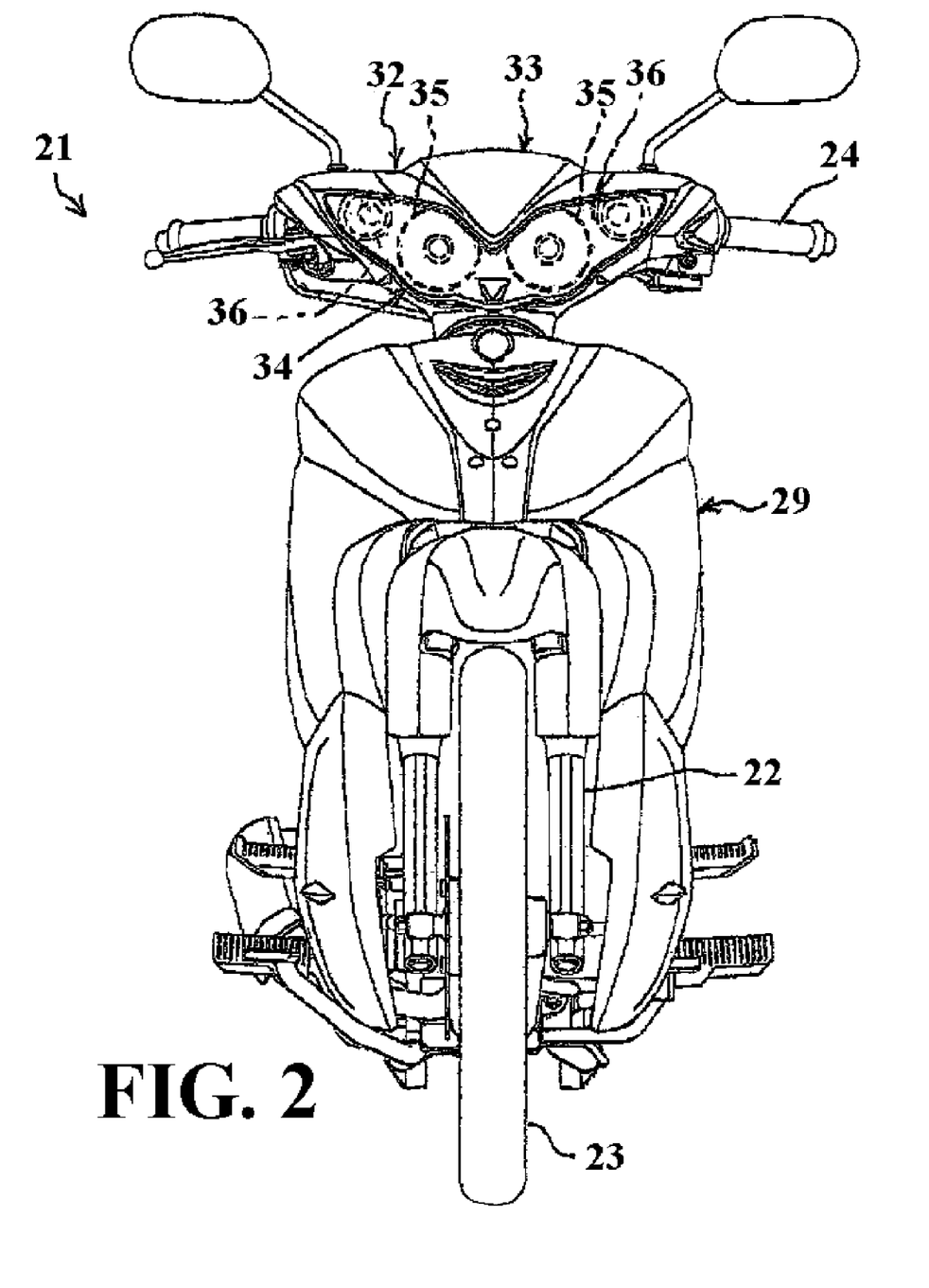
FIG. 2 is a front elevational view of the vehicle.
Figure 3:
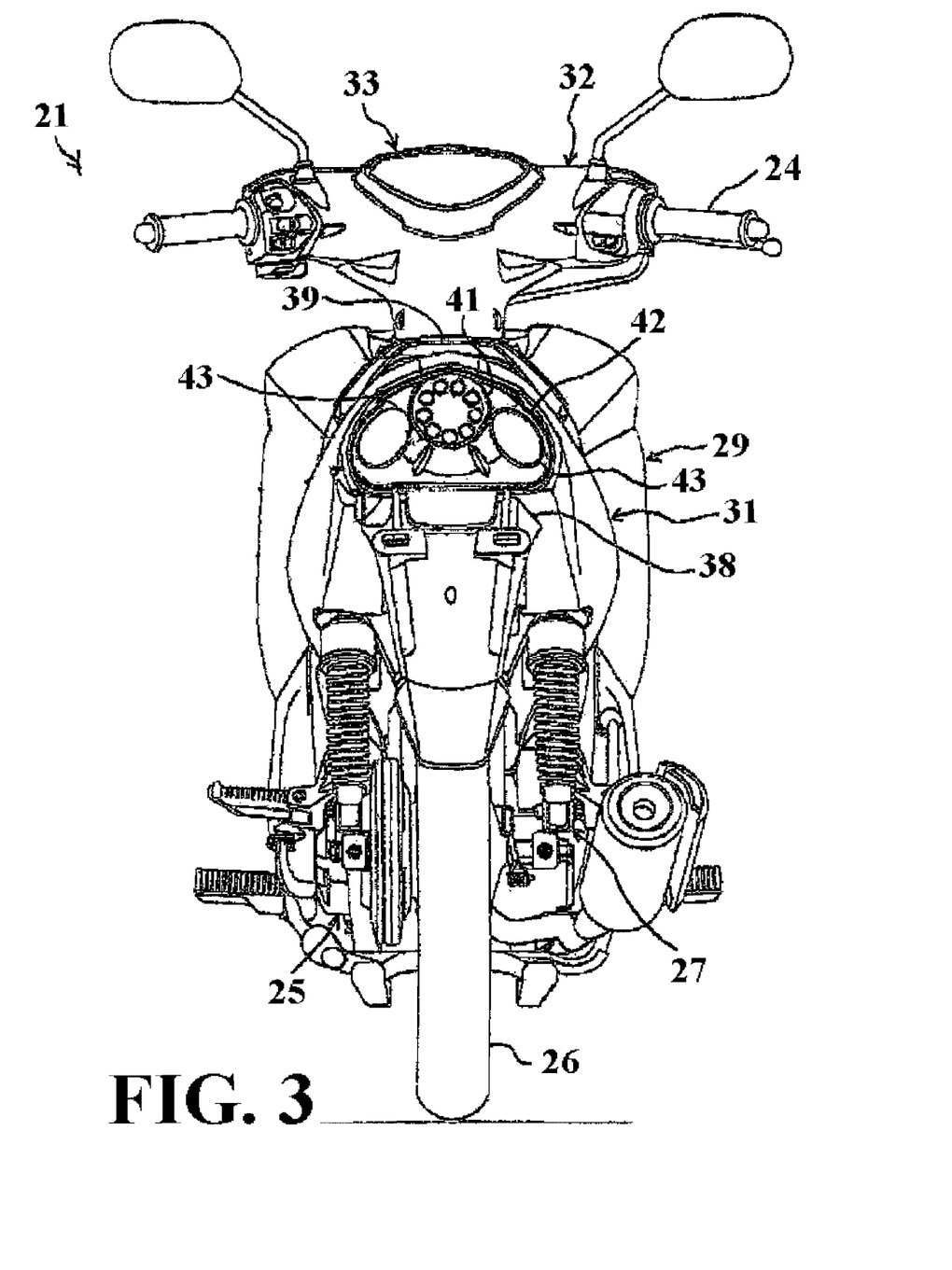
FIG. 3 is a rear elevational view of the vehicle.

Referring now in detail to the drawings and initially primarily to FIGS. 1-3, a vehicle embodying the invention, as an example, a motorcycle, is indicated generally by the reference numeral 21 denotes a motorcycle. The motorcycle 21 has a front fork 22 dirigibly supported at the front end of a body frame (generally hidden in the figures). A front wheel 23 is journalled at the lower end of the front fork 22. Steering handlebars 24 are mounted at the upper end of the front fork 22 for steering of the motorcycle 11 as is well known in the art.

The motorcycle 21 is powered by an engine transmission unit 25 suspended from and supported by the central portion of the body frame. This engine transmission unit 25 drives a rear wheel 26 journalled by a rear arm 27 that is pivotally supported by the central portion of the body frame and controlled by a suspension unit 28.

Positioned above the rear arm 27 is a seat 30 of tandem type to accommodate a rider and if desired a passenger two persons to straddle at its front and rear and mounted on the top rear portion of the body frame.

As has been noted, the body frame is generally enclosed. To this end its front half and rear half are covered by a front cover 29 and a rear cover 31, respectively.

The steering handlebars 24 are covered by a handlebar cover 32. The upper rear wall of the handlebar cover 32 is provided with a meter device 33 to display information to a rider and at its front wall is provided with a headlight assembly 34.

The headlight assembly 34 has a unitized configuration of a pair of left and right headlights 35 and a pair of left and right flasher lights 36 positioned laterally outward from the headlights 35.

The rear wall of the rear cover 31 at its is provided with a taillight assembly 35 that incorporates an embodiment of the present invention. The taillight assembly 35 is enclosed by an upper wall portion 35a, left and right side wall portions 35b, and a bottom wall portion 35c of the rear cover 35 without gaps. A rear fender 38 is provided below the taillight assembly 35 to cover the region above and rearward of the rear wheel 26. Reference numeral 39 denotes a grab bar for the rider seated at the rear, which is provided along the rear edge of the seat 30.

Figure 4:
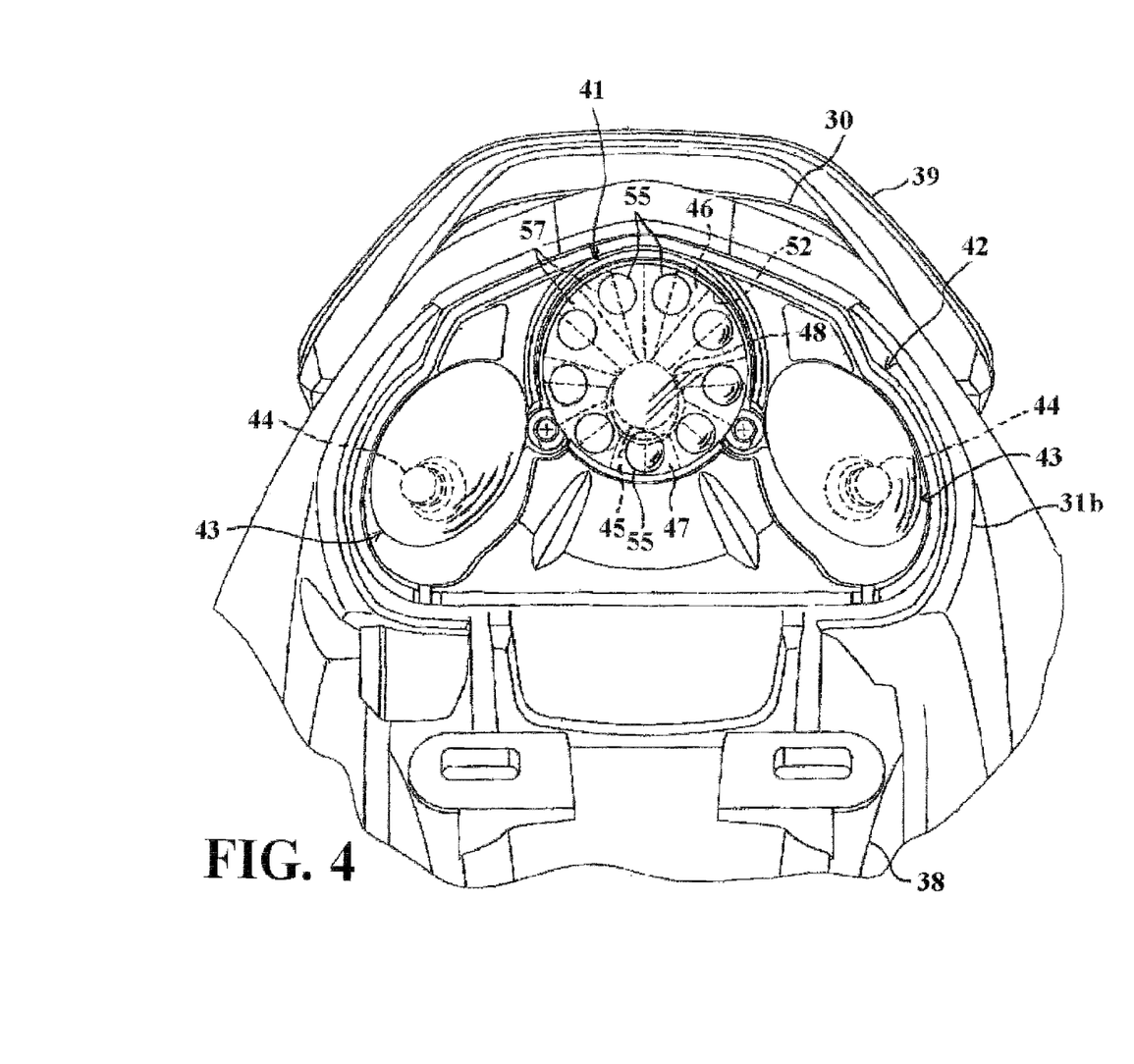
FIG. 4 is an enlarged rear elevational view looking in the same direction as FIG. 3 showing the light source embodying the invention.

The taillight assembly 35 has a unitized configuration consisting of a taillight portion 41 positioned laterally centrally in a taillight housing 42, and a pair of left and right rear flasher lights 43 positioned laterally outward from the taillight portion 41.

As seen from the rear side of the vehicle, the taillight portion 41 is formed in a perfect circular shape, and the left and right rear flasher lights 43 are formed in an oval shape. The left and right flasher lights 43 each have a lamp bulb 44. The taillight portion 41 and the left and right rear flasher lights 43 are each positioned so that their respective light axis "a" (FIG. 1) is oriented slightly obliquely downward and rearward.

Figure 7:
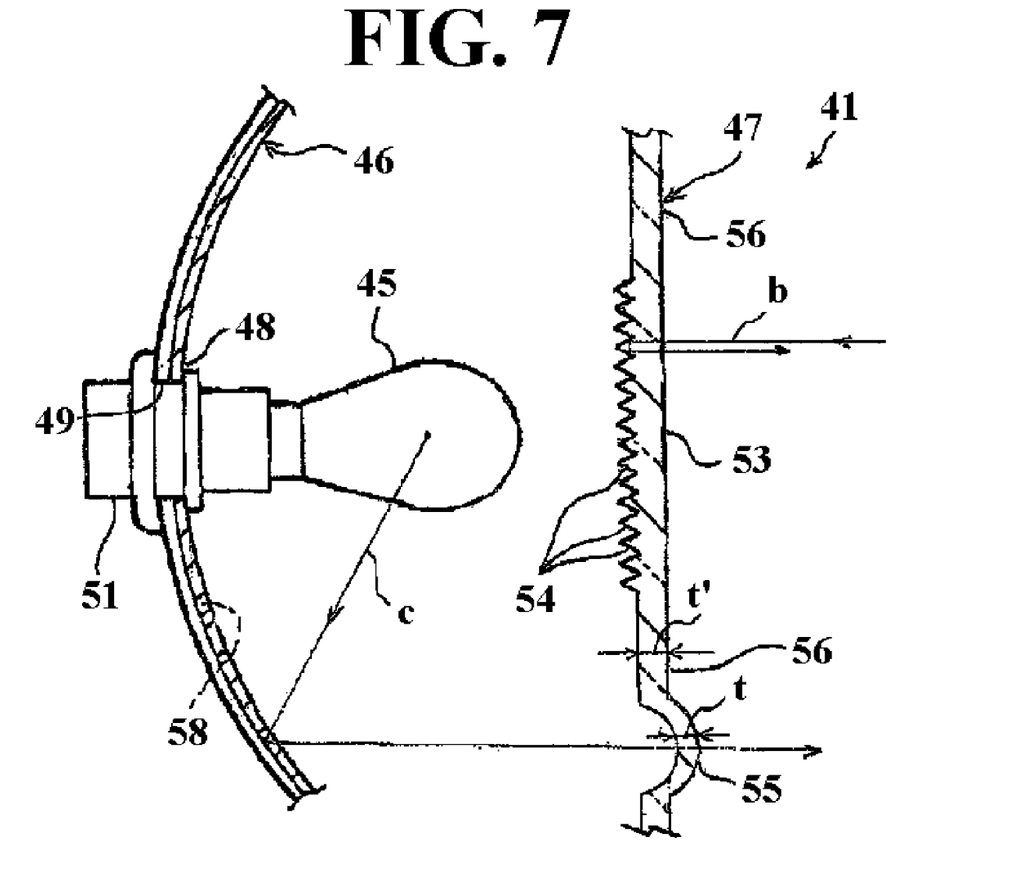
FIG. 7 is an enlarged cross sectional view taken along the line 7-7 of FIG. 6.

The taillight portion 41 has as a single light source a lamp bulb 45, mounted in a manner to be described, between an inner reflective lens 46 for reflecting light from the lamp bulb 45, and an outer lens 47 for covering the lamp bulb 45 and the inner reflective lens 46. The outer lens 47 is positioned opposite the inner reflective lens 46 with respect to the lamp bulb 45, in other words, rearwardly from the lamp bulb 45.

The inner reflective lens 46 is made of resin and has a generally dome shape with a rearward facing opening. The inner surface of the inner reflective lens 46 is formed with a reflective coating such as chromium plating. As seen best in FIG. 7, the inner reflective lens 46 at the center of its depression 48 is formed with a bulb fitting opening 49, in which a socket 51 is received. The lamp bulb 45 is removably mounted in the socket 51 from the rear side of the vehicle as seen in this figure. The outer lens 47 has a generally flat-plate shape and is fitted in an opening 52 (FIG. 4) of the inner reflective lens 46.

Figure 5:
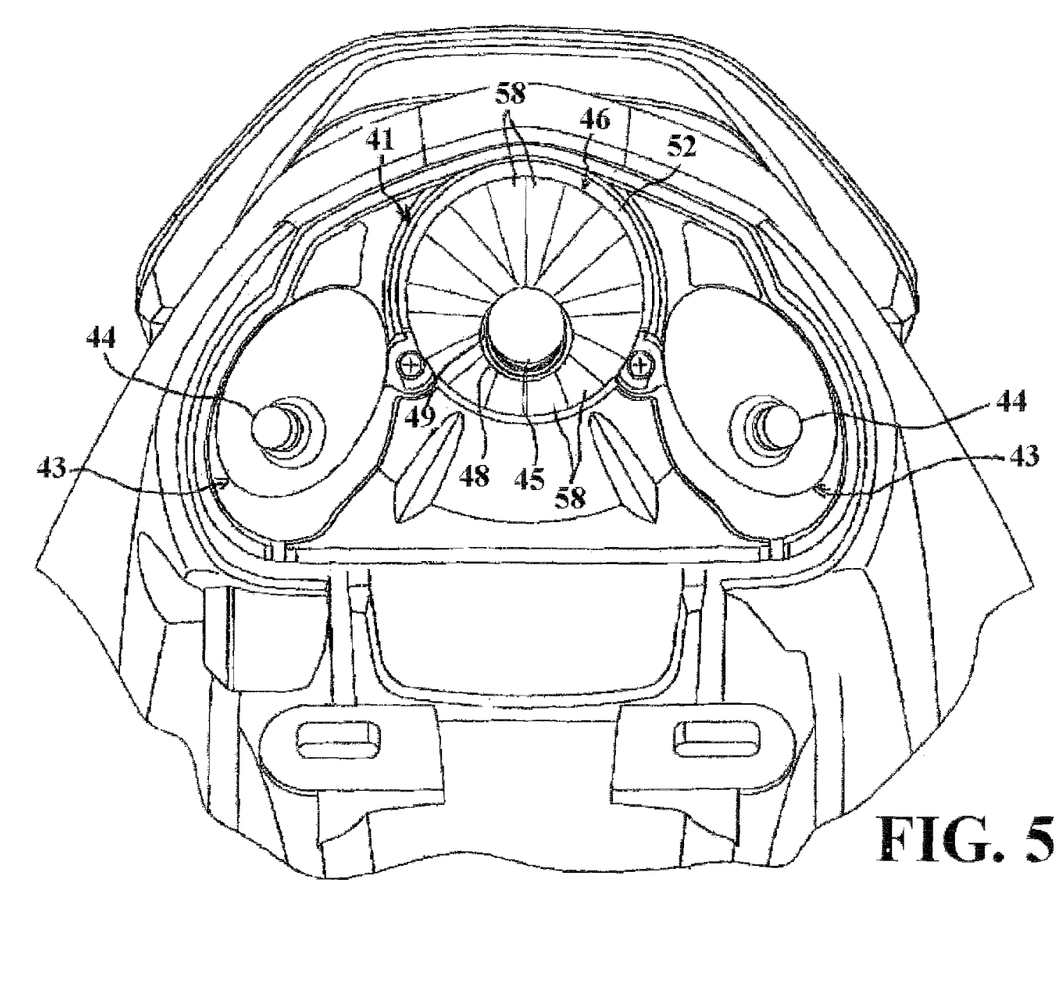
FIG. 5 is a view of the structure shown in FIG. 4 with the light covers removed.
Figure 6:
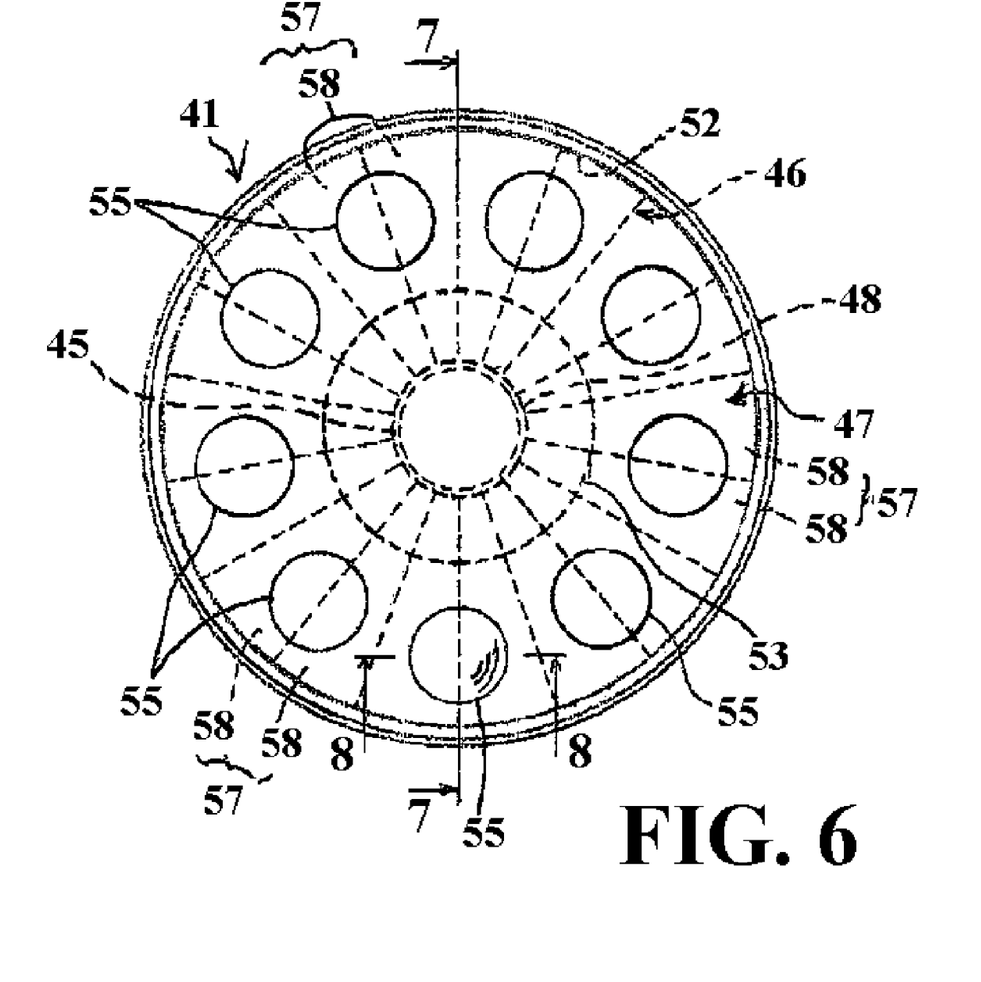
FIG. 6 is a view looking in the same direction as FIGS. 4 and 5 but showing only the light source embodying the invention.

It should be noted that in FIGS. 4 and 5, the lamp bulb 45 appears to be displaced downward from the center of the taillight portion 41. However this appears this way because the taillight portion 41 is inclined with its lower portion positioned forward and its upper portion positioned rearward. However and as shown in FIG. 6, the lamp bulb 45 is positioned in the center of the taillight portion 41, as viewed along its centerline.

The outer lens 47 is formed in a disc shape from red synthetic resin capable of transmitting light. The rear surface of the outer lens 47 is basically formed in the shape of a flat surface as best seen in FIG. 7. As seen in this figure, the central portion of the outer lens 47 that covers the lamp bulb 45 is integrally formed with a reflecting portion 53. The reflecting portion 53 is formed in a circular shape having a diameter approximately twice as large as a maximum diameter of the lamp bulb 45.

The area of the reflecting portion 53 facing the lamp bulb 45 (toward the front side of the vehicle) is formed with a number of reflective elements 54 having a generally sawtooth shape in section. The reflective elements 54 have lower light transmittance than the other portion of the outer lens and are adapted not to transmit light from the lamp bulb 45 to the outside. The reflective elements 54 also have a function of reflecting light incident from the rear side of the vehicle in the direction of the arrow b like a mirror. Thus as viewed from behind the motorcycle 21, the lamp bulb 45 is covered by the reflecting portion 53 so that it cannot be seen.

The outer lens 47 at its outer region and around the reflective portion 53 has a plurality of lens elements formed as protrusions (light-transmitting portions) 55 formed to be positioned on the periphery of a common circle centered on the lamp bulb 45 and at equal angular intervals. As a specific example, nine such protrusions 55 are formed at intervals of 40 degrees.

The protrusions 55 are integrally formed on the outer lens 47 and project in the direction away from the lamp bulb 45, namely, to the rear side of the vehicle. The protrusions 55 are also formed to have higher light transmittance than the surrounding peripheral region 56. To be specific, each protrusion 55 has a generally dome shape, and its thickness t is smaller than thickness t' of the peripheral region 56 (FIG. 7).

Figure 8:
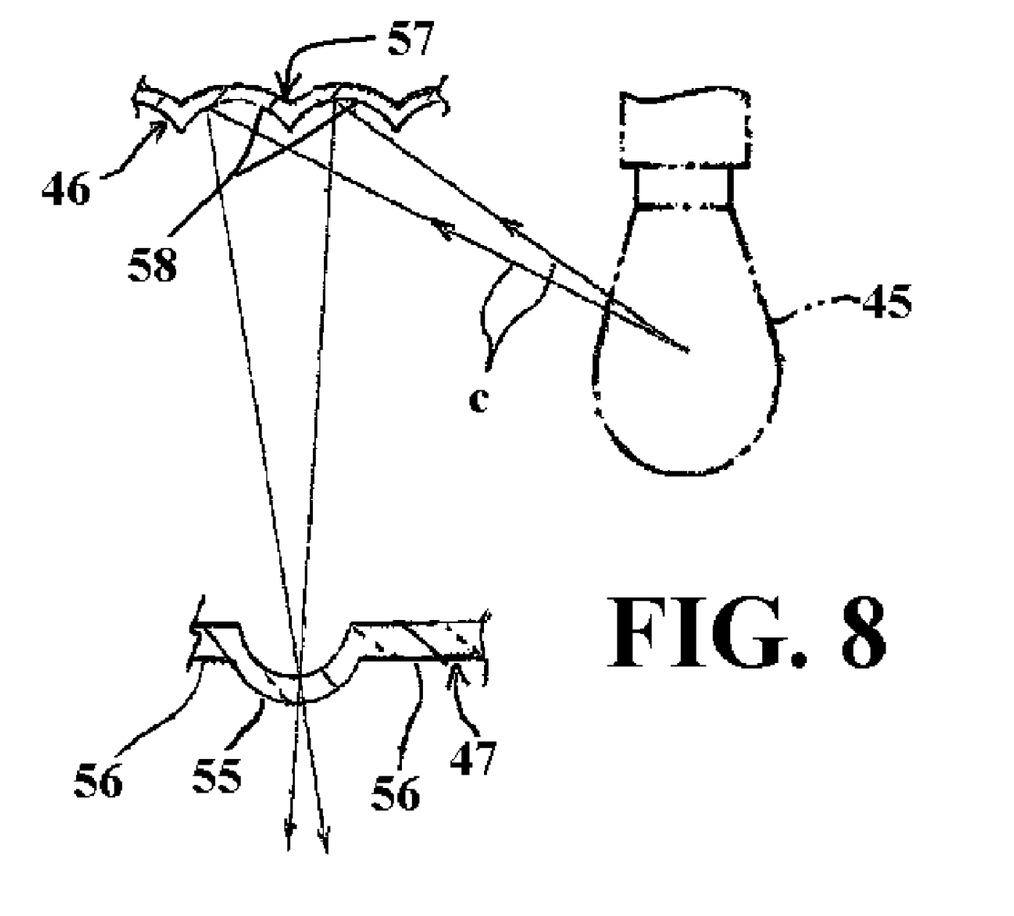
FIG. 8 is an enlarged cross sectional view taken along the line 8-8 of FIG. 6.

The inner reflective lens 46 has a plurality of light-collecting portions 57 one for each protrusion 55, for collecting light in the direction of the arrow C in FIGS. 7 and 8 from the lamp bulb 45 and directing it to its corresponding protrusion 55. Each of the light-collecting portion 57 is made up of two lens like recesses 58 for each protrusion 55. The recesses 58 are formed to face their corresponding protrusion 55 and extend radially outward from the lamp bulb 45.

In this embodiment, the outer lens 47 at its outer region has the rearward protrusions 55 formed at predetermined angular intervals, and the inner reflective lens 46 is formed with the light-collecting portions 57 for collecting the light from the lamp bulb 45 and directing it to their corresponding protrusions 55. Therefore, the light from the lamp bulb 45 is collected and reflected by the recesses 58 of the light-collecting portions 57 of the inner reflective lens 46 to the protrusions 55. This can provide appearance as if the taillight assembly 35 had nine light sources, although it has the single lamp bulb 45, which improves its appearance. The positional relation between the protrusions 55 and the light-collecting portion 57 and the lamp bulb 45 shown in FIG. 8 is a conceptual illustration to facilitate understanding.

Thus from the foregoing description it should be readily apparent to those skilled in the art that an improvement in appearance and light transmission is possible using a simple configuration of the protrusions 55 formed on the outer lens 47 and the light-collecting portions 57 formed on the inner reflective lens 46 and only the single lamp bulb 45. Thus cost is reduced compared to when the device has a plurality of light sources as in the prior art. Of course those skilled in the art will readily realize that the foregoing description is only that of an exemplary embodiment and various changes may be made to practice the invention. For example, the reflecting portion 53 and the protrusions 55 are integrally formed on the outer lens in the foregoing embodiment, but these may be formed as separate components from the outer lens and attached thereto by bonding, welding or the like. Also the protrusions are made thin in thickness to configure the highly light-transmitting portions. However, to configure the protrusions as the highly light-transmitting portions, they may be formed from material of higher light transmittance than the peripheral region and attached to the outer lens by bonding, welding or the like. The highly light-transmitting portions can also be realized through change in the shape of the protrusions.

Further, in the specifically described embodiment, the protrusions 55 are positioned at equal angular intervals on the periphery of a common circle. However, positioning the protrusions is not limited to such manner but may be as appropriate according to needs in design or the like. For example, the protrusions may be positioned on the peripheries of two circles of different diameters or on the periphery of an ellipse, or in a square, polygonal or trapezoidal manner. Also although the light-transmitting portions are formed in protrusions they need not be formed in protrusions but may be configured in recesses, for example.

Further, in the foregoing embodiment, description has been made of an example in which the present invention is applied to the taillight assembly 35 for a motorcycle. However, the light device of the present invention is also applicable to a headlamp device for any other type of vehicle. Of course those skilled in the art will readily understand that the described embodiments are only exemplary of forms that the invention may take and that various changes and modifications may be made without departing from the spirit and scope of the invention, as defined by the appended claims.

What is claimed is:

1. A light source for a vehicle or the like comprising a light housing defining an internal cavity between a rear reflective portion and a front light transmitting portion, a light emitting device holder adapted to support a single emitting device source within said internal cavity, said front light transmitting portion having a plurality of highly transparent portions for transmitting light reflected from said single light emitting device by said rear reflective portion and surrounded by less transparent portions to provide a view that emulates multiple light sources, said front light transmitting portion having an opaque area overlying said single emitting device source so that it is not directly visible and functioning as a mirror for reflecting external light back to its source.

2. A light source as set forth in claim 1 wherein the opaque portion has a serrated surface facing the single emitting device source for reflecting back the external light.

3. A light source as set forth in claim 1 wherein the plural transparent portions have a thinner wall thickness than the less transparent portion.

4. A light source as set forth in claim 1 wherein the transparent portions are configured as lenses.

5. A light source as set forth in claim 4 wherein each of the transparent portions are formed as protrusions on the outer surface of the light transmitting portion.

6. A light source as set forth in claim 1 wherein the rear reflective portion is formed with a plurality of light reflective areas each of which directs the reflected light to a respective one of the highly transparent portions.

7. A vehicle having a body adapted to carry at least one rider and having a light source as set forth in claim 1 and facing in a direction of travel of the vehicle.

* * * * *